United States Patent Office 3,427,321
Patented Feb. 11, 1969

3,427,321
N,N',9-O-TRI-LOWERALKANOYL-ACTINOSPECTACINS
Herman Hoeksema, Cooper Township, Kalamazoo County, Mich., assignor to The Upjohn Company, Kalamazoo, Mich., a corporation of Delaware
No Drawing. Continuation-in-part of applications Ser. No. 167,915, Jan. 22, 1962, and Ser. No. 386,742, July 31, 1964. This application Apr. 29, 1966, Ser. No. 546,171
The portion of the term of the patent subsequent to May 18, 1982, has been disclaimed
U.S. Cl. 260—340.3    8 Claims
Int. Cl. C07d 21/00; A61k 21/00

ABSTRACT OF THE DISCLOSURE

N,N'-diacylactinospectacin and N,N',9-O-triacylactinospectacin and process for preparing these compounds. These compounds are acyl derivatives of the antibiotic actinospectacin. N,N'-diacylactinospectacin and N,N',9-O-triacylactinospectacin can be used to upgrade crude preparations of actinospectacin.

---

This application is a continuation-in-part of my copending applications Ser. Nos. 167,915, filed Jan. 22, 1962, now abandoned, and 386,742, filed July 31, 1964, now abandoned.

This invention relates to novel compositions of matter and to a process for the preparation thereof, and is particularly directed to acyl derivatives of actinospectacin possessing unexpected properties and to a process producing the same.

Actinospectacin is a biosynthetic product produced by the controlled fermentation of *Streptomyces spectabilis* as disclosed in U.S. Patent 3,234,092. Actinospectacin is characterized by an optical rotation $[\alpha]_D^{25} = -20°$ (H$_2$O); by solubility in water, methanol, and ethanol, and by insolubility in acetone and hydrocarbon solvents; and by the presence of two basic groups: pKa$_1$ 6.95 (H$_2$O), pKa$_2$ 8.70 (H$_2$O). The molecular formula for actinospectacin is C$_{14}$H$_{24}$N$_2$O$_7$. Actinospectacin is antibacterially active in vitro.

It has now been found that novel compounds according to this invention, which are not antibacterially active in vitro, are obtained by acylating actinospectacin (I). On acylation, actinospectacin (I) is converted to a diacylate in which the acyl groups are attached to the nitrogen atoms (N,N'-diacylactinospectacin) and a triacylate in which the third acyl group is attached to an oxygen atom (N,N',9-O-triacylactinospectacin). Subsequent to this invention, the structure of actinospectacin has been elucidated. The novel compounds of the invention therefore can now be represented by the following formula:

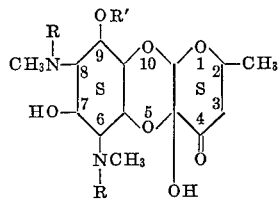

wherein R is selected from the group consisting of hydrocarbon carboxylic acid acyl of from two to twelve carbon atoms, inclusive; halo-, nitro-, hydroxy-, amino-, cyano-, thiocyano, and lower-alkoxy substituted hydrocarbon carboxylic acid acyl of from two to twelve carbon atoms, inclusive; and lower alkoxycarbonyl, and wherein R' is selected from the class consisting of hydrogen and hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxycarbonyl.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated, or unsaturated cycloaliphatic carboxylic acid, for example, cyclobutanecarboxylic acid, cyclopentanecarboxylic acid, cyclopentenecarboxylic acid, methylcyclopentene-carboxylic acid, cyclohexane-carboxylic acid, dimethylcyclohexene-carboxylic acid, dipropylcyclohexane-carboxylic acid, and the like; (c) a saturated or unsaturated cycloaliphatic-substituted aliphatic carboxylic acid, for example, cyclopentane-acetic acid, cyclopentane-propionic acid, cyclopentene-acetic acid, cyclohexanebutyric acid, methylcyclohexane-acetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, and naphthylacetic acid, and the like.

The term "halogen-, nitro-, hydroxy-, amino-, cyano-, thiocyano-, and lower-alkoxy-substituted hydrocarbon carboxylic acid acyl of from two to twelve carbon atoms, inclusive" is intended to mean hydrocarbon carboxylic acid acyl as hereinbefore defined which are substituted by one or more halogen atoms, nitro, hydroxy, amino, cyano, thiocyano, or loweralkoxy groups. By "loweralkoxy" is meant an alkoxy group of from one to six carbon atoms, inclusive, for example, methoxy, ethoxy, propoxy, butoxy, pentyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanacetic acid, thiocyanoacetic acid, cyanopropionic acid, lactic acid, glycine, ethoxyformic (ethyl hemicarbonate), and the like.

The N,N'-diacyl and N,N',9-O-triacyl derivatives of actinospectacin according to the invention are obtained by acylating actinospectacin. When actinospectacin (I) is reacted with an appropriate acid anhydride or chloride, the corresponding N,N'-diacyl- and N,N',9-O-triacylactinospectacin is obtained. For example, on reacting actinospectacin (I) with acetic anhydride in the presence of pyridine, N,N'-diacetylactinospectacin (II) and N,N',9-O-triacetylactinospectacin (III) are obtained. Novel compounds of this invention are also obtained by acting upon actinospectacin (I) with a lower alkoxy haloformate (lower alkyl halocarbonate) to obtain the corresponding polyalkoxycarbonylactinospectacin. For example, on reacting actinospectacin (I) with ethyl chloroformate (ethyl chlorocarbonate) in the presence of pyridine there is obtained N,N',9-O-triethoxycarbonylactinospectacin (IV). N,N'-diethoxycarbonylactinospectacin (V) is obtained when a lesser amount of ethyl chloroformate is used. Mixed acylates can be obtained by acylating the N,N'-diacyl derivative of actinospectacin with a different acylating agent. For example, on reacting N,N'-diacetylactinospectacin (II) with sodium propionate and propionic anhydride the corresponding mixed acylate is obtained. Mixed acylates are similarly obtained with N,N'-diethoxycarbonylactinospectacin.

The novel compounds of the invention, N,N'-diacylactinospectacin and N,N',9-O-triacylactinospectacin are useful as intermediates to make actinamine. The reaction can be carried out by acid hydrolysis. Hydrolysis of the starting material, e.g., N,N'-diacylactinospectacin or N,N', 9-O-triacylactinospectacin is effected by contact thereof with an acidic material, e.g., a strong mineral acid such as hydrogen chloride, hydrogen bromide, hydrogen iodide, sulfuric acid, phosphoric acid, and the like. Preferably, hydrochloric acid is used as the hydrolyzing agent and when so used actinamine is isolated as a hydrochloride; the other acids listed also can be used for the hydrolysis and when so used the product is isolated as the corresponding mineral acid salt. Actinamine is a useful compound as disclosed in U.S. Patent 3,244,743.

The novel compounds of the invention also are useful to upgrade crude preparations of actinospectacin. For example, crude actinospectacin can be acylated, as disclosed herein, to remove unacylatable impurities. The acylated actinospectacin then can be deacylated to provide a purified preparation of actinospectacin, or, alternatively, the acylated actinospectacin can be hydrolyzed with an acid, as disclosed herein, to produce actinamine.

The following examples are illustrative of the process and products of the present invention, but are not to be construed as limiting.

Example 1.—N,N'-diacetylactinospectacin

To one gram of actinospectacin base dissolved in 20 ml. pyridine and chilled to 5° C. was slowly added 0.855 ml. (3 mole equivalents) of acetic anhydride in 10 ml. pyridine. This was stored seven days at room temperature and then evaporated to dryness under high vacuum, dissolved in ethyl acetate and reprecipitated with Skellysolve B (isomeric hexanes). The resulting precipitate was distributed in a Craig countercurrent machine in the system 1-butanol and water. Two equivalent peaks, K=0.11 and K=0.38 were observed. Solids were isolated by evaporation of each of these peak fractions. The former peak, N, N'-diacetylactinospectacin, contained no titratable groups and appeared very similar to actinospectacin in the infrared.

*Elemental analysis.*—Calculated for $C_{18}H_{28}N_2O_9 \cdot H_2O$: C, 49.76; H, 6.96; N, 6.45; C—$CH_3$, 10.4. Found: C, 49.20; H, 7.07; N, 6.29; C—$CH_3$, 10.3.

Example 2.—N,N',9-O-triacetylactinospectacin

The fractions from the second peak described in Example 1 (K=0.38) were collected and evaporated. The solid was extracted and reprecipitated with ethyl acetate and Skellysolve B. The resulting N,N',9-O-triacetylactinospectacin had no basic groups as evidenced by titration.

*Elemental analysis.*—Calculated for $C_{20}H_{30}N_2O_{10} \cdot H_2O$: C, 50.41; H, 6.77; N, 5.88; C—$CH_3$, 12.60. Found: C, 50.76; H, 6.79; N, 5.97; C—$CH_3$, 12.1.

This compound, N,N',9-O-triacetylactinospectacin, was also obtained by treatment of actinospectacin with six moles of acetic anhydride. Countercurrent distribution showed the identity.

Example 3.—N,N',9-O-triethoxycarbonylactinospectacin

To a 5 ml. solution of pyridine containing 1 g. of actinospectacin base was added a total of 3 ml. (3 mole equivalents) ethyl chloroformate. No effort was made to control temperature, and considerable heat was evolved. Ten days later, after evaporation, the residue was taken into ethyl acetate, washed with water, and the solution dried over sodium sulfate. On evaporation of this solution 1.03 g. of solid material was obtained which was distributed in a Craig countercurrent machine in the solvent system cyclohexane, ethyl acetate, 95% ethanol, $H_2O$ (4:6:5:5) for 200 transfers. From this countercurrent distribution an analytical sample of N,N',9-O-triethoxycarbonylactinospectacin was obtained which showed no basic groups upon titration.

*Elemental analysis.*—Calculated for $C_{23}H_{36}N_2O_{13}$: C, 50.36; H, 6.59; N, 5.11; ethoxyl, 24.6. Found: C, 50.83; H, 6.62; N, 4.84; ethoxyl, 24.06.

Example 4

By substituting the 3 mole equivalents of ethyl chloroformate in Example 3 by 2 mole equivalents of ethyl chloroformate there is obtained N,N'-diethoxycarbonylactinospectacin.

Example 5

By substituting the acetic anhydride in Example 1 by propionic anhydride there is obtained the corresponding N,N'-dipropionylactinospectacin.

Example 6

By substituting the acetic anhydride and pyridine in Example 1 by acetyl chloride, propionyl bromide, butyryl chloride, valeryl chloride, caproyl chloride, heptanoyl chloride, and caprylyl chloride and at least a stoichiometric amount of triethylamine there is obtained the corresponding N,N'-diacetyl-, N,N'-dipropionyl-, N,N'-dibutyryl-, N,N'-divaleryl-, N,N'-dicaproyl-, N,N'-diheptanoyl-, N,N'-dicaprylyl-, N,N',9-O-triacetyl-, N,N',9-O-tripropionyl-, N,N',9-O-tributyryl-, N,N',9-O-trivaleryl-, N,N',9-O-tricaproyl-, N,N',9-O-triheptanoyl-, and N,N',9-O-tricaprylylactinospectacin.

Example 7

By substituting the ethylchloroformate in Example 3 by methyl, propyl, butyl, pentyl, hexyl, heptyl, and octyl chloroformate there is obtained the corresponding trimethoxycarbonyl-, tripropoxycarbonyl-, tributoxycarbonyl-, tripentyloxycarbonyl-, trihexyloxycarbonyl-, triheptyloxycarbonyl-, and trioctyloxycarbonylactinospectacin.

Example 8

By substituting the ethyl chloroformate in Example 4 by methyl, propyl, butyl, pentyl, hexyl, heptyl, and octyl chloroformate there is obtained the corresponding N,N'-dimethoxycarbonyl-, N,N'-dipropoxycarbonyl-, N,N'-dibutoxycarbonyl-, N,N'-dipentyloxycarbonyl-, N,N'-dihexyloxycarbonyl-, N,N'-diheptyloxycarbonyl-, and N,N'-dioctyloxycarbonylactinospectacin.

I claim:
1. A compound of the formula

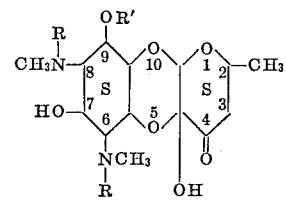

wherein R is selected from the group consisting of hydrocarbon carboxylic acid acyl of from two to twelve carbon atoms, inclusive, halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl; and wherein R' is selected from the group consisting of hydrogen, hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl.

2. N,N'-di-lower-alkanoylactinospectacin.
3. N,N'-diacetylactinospectacin.
4. N,N',9-O-tri-lower-alkanoylactinospectacin.
5. N,N',9-O-triacetylactinospectacin.
6. N,N'-9-O-tri-lower-alkoxycarbonylactinospectacin.
7. N,N',9-O-triethoxycarbonylactinospectacin.
8. A process for making compounds of the formula in claim 1 which comprises reacting actinospectacin with an acylating agent selected from the group consisting of acid anhydrides and acid halides of hydrocarbon carboxylic acids acyl of from two to twelve carbon atoms, inclusive, and halo-, nitro-, hydroxy-, amino-, cyano-, thiocyano-, and lower-alkoxy-substituted hydrocarbon carboxylic acids of from two to twelve carbon atoms, inclusive; and lower alkoxycarbonyl halides.

References Cited
UNITED STATES PATENTS

| | | | |
|---|---|---|---|
| 3,207,746 | 9/1965 | Hoeksema | 260—340.3 |
| 3,244,743 | 4/1966 | Hiley | 260—488 |
| 3,184,478 | 5/1965 | Birkenmeyer et al. | 260—340.3 |

FOREIGN PATENTS

| | | |
|---|---|---|
| 959,876 | 6/1964 | Great Britain. |

ALEX MAZEL, *Primary Examiner.*

J. H. TURNIPSEED, *Assistant Examiner.*

U.S. Cl. X.R.

260—999